(No Model.)

H. M. YALE.
BALL AND SOCKET JOINT.

No. 357,749. Patented Feb. 15, 1887.

Witnesses

Inventor
Hiram M. Yale
By his Attorney

UNITED STATES PATENT OFFICE.

HIRAM M. YALE, OF ALBION, NEW YORK.

BALL-AND-SOCKET JOINT.

SPECIFICATION forming part of Letters Patent No. 357,749, dated February 15, 1887.

Application filed May 22, 1886. Serial No. 202,986. (No model.)

*To all whom it may concern:*

Be it known that I, HIRAM M. YALE, a citizen of the United States, residing at Albion, in the county of Orleans and State of New York, have invented certain new and useful Improvements in Ball-and-Socket Joints; and I do hereby declare the following to be a full, clear, and exact description of the invention, such as will enable others skilled in the art to which it appertains to make and use the same.

My invention relates to ball-and-socket joints; and it consists, essentially, in the combination of a socket formed of two concaved plates to fit the surface of two balls, a strap, bolt, or link connected with said plates, and a cam or eccentric for contracting and holding the parts of the socket upon and releasing the same from the ball.

My invention may be used wherever universal couplings are desired; but it is shown as applied to the pitman and sickle-bar of mowers and harvesters.

Figure 1:
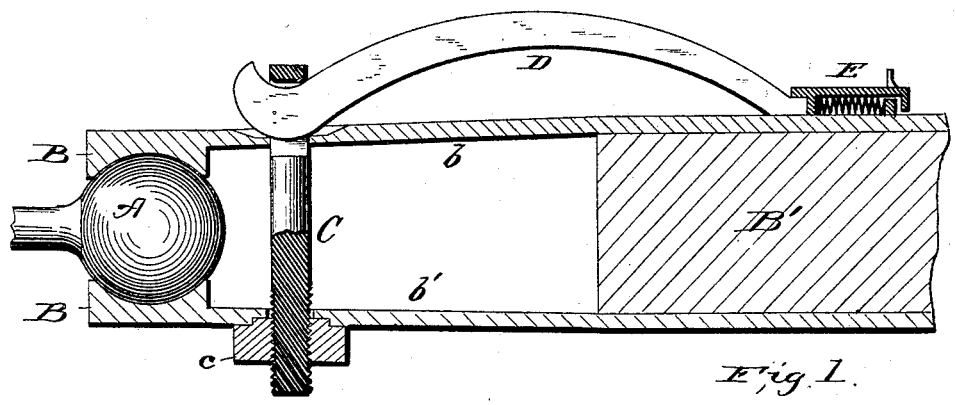
Figure 2:
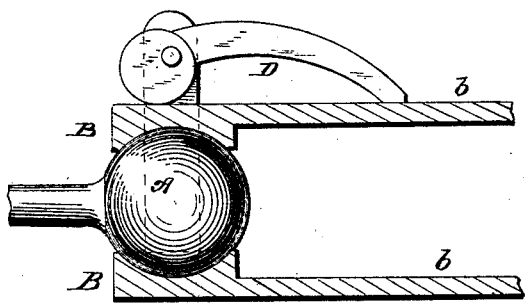
Figure 3:
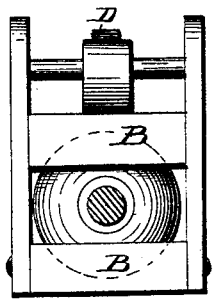

In the drawings, Figure 1 represents a longitudinal section showing parts in elevation, and Fig. 2 a view of a modification of the same. Fig. 3 is an end elevation of the invention as shown in Fig. 2.

A is the ball, shown in this application connected with the reciprocating sickle-bar of a mower or harvester, and B B are the concaved plates forming the socket, connected or formed with a pitman or shaft, B'. As shown, these concaved plates are formed on the ends of spring-arms $b\ b'$; but, obviously, they may be made separate and connected in any suitable manner with a pitman or shaft, and may be embraced by a strap with which the cam or eccentric co-operates to contract the socket-plates.

C is a bolt, having a slot or mortise through one end in which an eccentric or cam may operate, and D is a lever having a hook and cam-face, as shown. The lever is secured in place to hold the socket upon the ball by a spring-catch, E, as shown. The bolt C, also, is provided with a thread, which receives a nut, $c$, having a projection which fits into a countersink in the plate or arm $b'$. This nut is for the purpose of compensating for wear in the socket and on the operating-cam D. The cam end of lever D is flat, so as to fit in the mortise in the end of bolt C, and its heel or portion which bears on the rim $b$ runs in a groove in said arm, which partially supports it. After the lever has been pressed down it may be secured by the spring-catch E, or by any other suitable device.

In Figs. 2 and 3 I have shown ears or lugs fixed to the sides of one of the socket-plates, extending beyond the other plate to support a pivot or shaft for an eccentric-disk. The disk has a lever connected with it, as shown. When the lever is turned down to the plate, the eccentric has passed slightly beyond the center, and thus locks itself down and dispenses with a catch or lock.

Having described my invention, what I claim is—

1. The combination of a socket, a connection for connecting the parts of the socket, and a cam for bringing and holding the socket to the ball, as specified.

2. The combination of a socket connected with spring-plates, a bolt provided with a slot, and a cam-lever operating in said slot to contract the parts of the socket upon the ball, or release the same from it, as specified.

3. The combination of a socket, a bolt having a slot, a shouldered nut, and a cam-lever, as specified.

4. A universal coupling consisting of the combination of a ball, socket-plates, slotted bolt, a cam-lever, and a spring-catch for locking the lever, substantially as described.

In testimony whereof I affix my signature in presence of two witnesses.

HIRAM M. YALE.

Witnesses:
WM. W. ARMSTRONG,
HENRY E. WARNER.